US012037819B2

(12) United States Patent
Samuelson (10) Patent No.: US 12,037,819 B2
(45) Date of Patent: Jul. 16, 2024

(54) OVERWING EXIT DOOR SYSTEM

(71) Applicant: The Boeing Company, Chicago, IL (US)

(72) Inventor: Benjamin T. Samuelson, Mountlake Terrace, WA (US)

(73) Assignee: The Boeing Company, Chicago, IL (US)

( * ) Notice: Subject to any disclaimer, the term of this patent is extended or adjusted under 35 U.S.C. 154(b) by 388 days.

(21) Appl. No.: 17/447,164

(22) Filed: Sep. 8, 2021

(65) Prior Publication Data

US 2022/0081941 A1 Mar. 17, 2022

Related U.S. Application Data

(60) Provisional application No. 63/078,665, filed on Sep. 15, 2020.

(51) Int. Cl.
*B64C 1/14* (2006.01)
*E05B 15/00* (2006.01)
*E05B 79/16* (2014.01)

(52) U.S. Cl.
CPC ............ *E05B 79/16* (2013.01); *B64C 1/1407* (2013.01); *E05B 15/004* (2013.01)

(58) Field of Classification Search
CPC ..... E05B 79/16; E05B 15/004; B64C 1/1407; B64C 1/143
See application file for complete search history.

(56) References Cited

U.S. PATENT DOCUMENTS

| 3,085,297 | A | * | 4/1963 | Linderfelt | ............. B64C 1/1407 49/248 |
| 5,031,863 | A | | 7/1991 | Noble | |
| 5,064,147 | A | * | 11/1991 | Noble | ................... B64C 1/1407 292/DIG. 31 |
| 5,305,969 | A | * | 4/1994 | Odell | .................... B64C 1/1407 292/259 R |

(Continued)

FOREIGN PATENT DOCUMENTS

| EP | 0876954 A2 | * | 11/1998 | ............... B64C 1/14 |
| EP | 0876954 A2 | | 11/1998 | |

(Continued)

OTHER PUBLICATIONS

Extended European Search Report (EESR) dated Jan. 24, 2022, regarding application No. 21187718, 9 pages.

*Primary Examiner* — Assres H Woldemaryam
(74) *Attorney, Agent, or Firm* — Yee & Associates, P.C.

(57) ABSTRACT

A system and method for an overwing exit door is provided. The overwing exit door system comprises a door, a handle connected to an inboard surface of the door, a guide track connected to a body of the aircraft, a roller, a first crank connected to the roller and associated with the handle, a first shaft system attached to the first crank, a latch system connected to the first shaft system, and a locking system associated with the latch system. The latch system comprises a rotating stop, a second crank associated with the rotating stop, and a second shaft system connected to the second crank and the rotating stop. These components together control operation of the overwing exit door between an open position and a closed position.

20 Claims, 9 Drawing Sheets

(56) References Cited

U.S. PATENT DOCUMENTS

| | | | | |
|---|---|---|---|---|
| 5,337,977 | A | * | 8/1994 | Fleming .................. B64C 1/143 |
| | | | | D12/345 |
| 2018/0134366 | A1 | * | 5/2018 | Merkel ................. B64C 1/1461 |
| 2018/0273156 | A1 | * | 9/2018 | Vergnot ................ B64C 1/1461 |
| 2021/0070416 | A1 | * | 3/2021 | Buchet .................... B64C 1/143 |

FOREIGN PATENT DOCUMENTS

| | | | | |
|---|---|---|---|---|
| EP | 3168138 | A1 | 5/2017 | |
| EP | 3323709 | A1 | 5/2018 | |
| WO | WO8401761 | A1 | 5/1984 | |
| WO | WO-2017056036 | A1 * | 4/2017 | ............ B64C 1/143 |

\* cited by examiner

OVERWING EXIT DOOR SYSTEM

RELATED PROVISIONAL APPLICATION

This application claims the benefit of U.S. Provisional Patent Application Ser. No. 63/078,665, filed Sep. 15, 2020, and entitled "Overwing Exit Door System;" which is incorporated herein by reference in its entirety.

BACKGROUND INFORMATION

1. Field

The present disclosure relates generally to aircraft door structures. More specifically, the present disclosure relates to an overwing exit door system in an aircraft.

2. Background

Passenger aircraft are equipped with overwing exit doors that allow egress for passengers during an emergency. Typically, passengers seated in an emergency exit row are tasked with pulling a handle or a lever on the door to initiate its unlocking and unlatching such that the door may be pushed outward into an open position. Manual unlatching of the door may require the passenger to lift or translate the door before it can open. In an emergency, where time is of the essence, complicated movement patterns for the overwing exit door may take longer than desired or create confusion among passengers.

In addition to the door itself, an overwing exit door system may have numerous mechanical parts and/or assemblies. These assemblies are used to properly latch and lock the door to comply with Federal Aviation Administration (FAA) airworthiness requirements for doors installed in transport category aircraft. These assemblies, however, add weight and complexity to the fuselage. The heavier the door, the more difficult it may be for a passenger to operate the door during an emergency.

Changes in FAA regulations for overwing exit doors necessitate new door system configurations. Previous door designs cannot be used on newly manufactured aircraft. Therefore, it would be desirable to have a method and apparatus that takes into account at least some of the issues discussed above, as well as other possible issues.

SUMMARY

An illustrative embodiment of the present disclosure provides a door system for an aircraft comprising a door, a piano hinge connecting the door to a body of the aircraft, a guide track connected to the body of the aircraft, a roller, a first crank connected to the roller, a first shaft system attached to the first crank, a latch system connected to the first shaft system, and a locking system. The first crank is configured to move the roller along the guide track. The first shaft system is configured to rotate the first crank and the roller. The latch system comprises a rotating stop, a second crank associated with the rotating stop, and a second shaft system connected to the second crank and the rotating stop. The second crank is configured to rotate the rotating stop from a latched position to an unlatched position. The locking system is associated with the rotating stop and is configured to secure the rotating stop in the latched position.

Another illustrative embodiment of the present disclosure provides a method for operating an overwing exit door. A handle connected to an inboard surface of the door is pulled to initiate movement of the first crank connected to a roller. The first crank moves the roller along the guide track. A second crank associated with the first crank rotates a rotating stop in a latch system about an axis from a latched position to an unlatched position. Manually, or automatically, the door swings outboard in a simple arc motion to an open position using a piano hinge connecting the door to a body of an aircraft.

A further illustrative embodiment of the present disclosure provides an aircraft having an overwing exit door system comprising a door frame, a door, a handle connected to an inboard surface of the door, a guide track connected to a body of the aircraft, a roller, a first crank connected to the roller and associated with the handle, a first shaft system attached to the first crank, a latch system connected to the first shaft system, and a locking system associated with the latch system. The latch system comprises a rotating stop, a second crank associated with the rotating stop, and a second shaft system connected to the second crank and the rotating stop. These components together control operation of the overwing exit door between an open portion and a closed position.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that overwing exit door design must have passenger safety as an utmost concern. FAA regulations provide airworthiness standards for fuselage exit doors and seek to prevent inadvertent opening of those doors during flight. The guidelines provide for multiple layers of protection against failures, malfunctions, and human error. Thus, updated FAA regulations require both a latch system and a locking system, as well as means by which the system is restrained from being back driven from the latches. Previously used overwing exit door designs still present in many of the currently operating aircraft may not meet the new requirements. Therefore, new aircraft will require a more robust door system design.

The illustrative embodiments also recognize and take into account that some currently used overwing exit door systems are more complex for a passenger to operate than desired. For example, during an emergency, an exit door may need to be maneuvered by lifting or translating the door prior to pushing it outboard of the aircraft. Such movements may be confusing and difficult, especially with heavy door assemblies. Additionally, door assemblies with multiple stops and connections to the aircraft body may impede egress of passengers. Moreover, some current designs may hyper-extend the door along its opening path and risk collision between the door and the body of the aircraft.

The illustrative embodiments further recognize and take into account that the sealing mechanism for an overwing exit door may require segments of sealing material and gaps between the door and the doorframe that are larger than is preferred. These gaps and segmented seals may not seal as well as a continuous piece of sealing material.

Thus, the disclosed embodiments provide a system and method for overwing exit door operation that utilizes rotating interfaces rather that sliding interfaces and reduces the weight and complexity of the assembly. The overwing exit door system comprises a door frame, a door, a handle connected to an inboard surface of the door, a guide track connected to a body of the aircraft, a roller, a first crank connected to the roller and associated with the handle, a first shaft system attached to the first crank, a latch system connected to the first shaft system, and a locking system associated with the latch system. The latch system comprises a rotating stop, a second crank associated with the rotating stop, and a second shaft system connected to the second crank and the rotating stop. These components together control operation of the overwing exit door between an open portion and a closed position.

Figure 1:
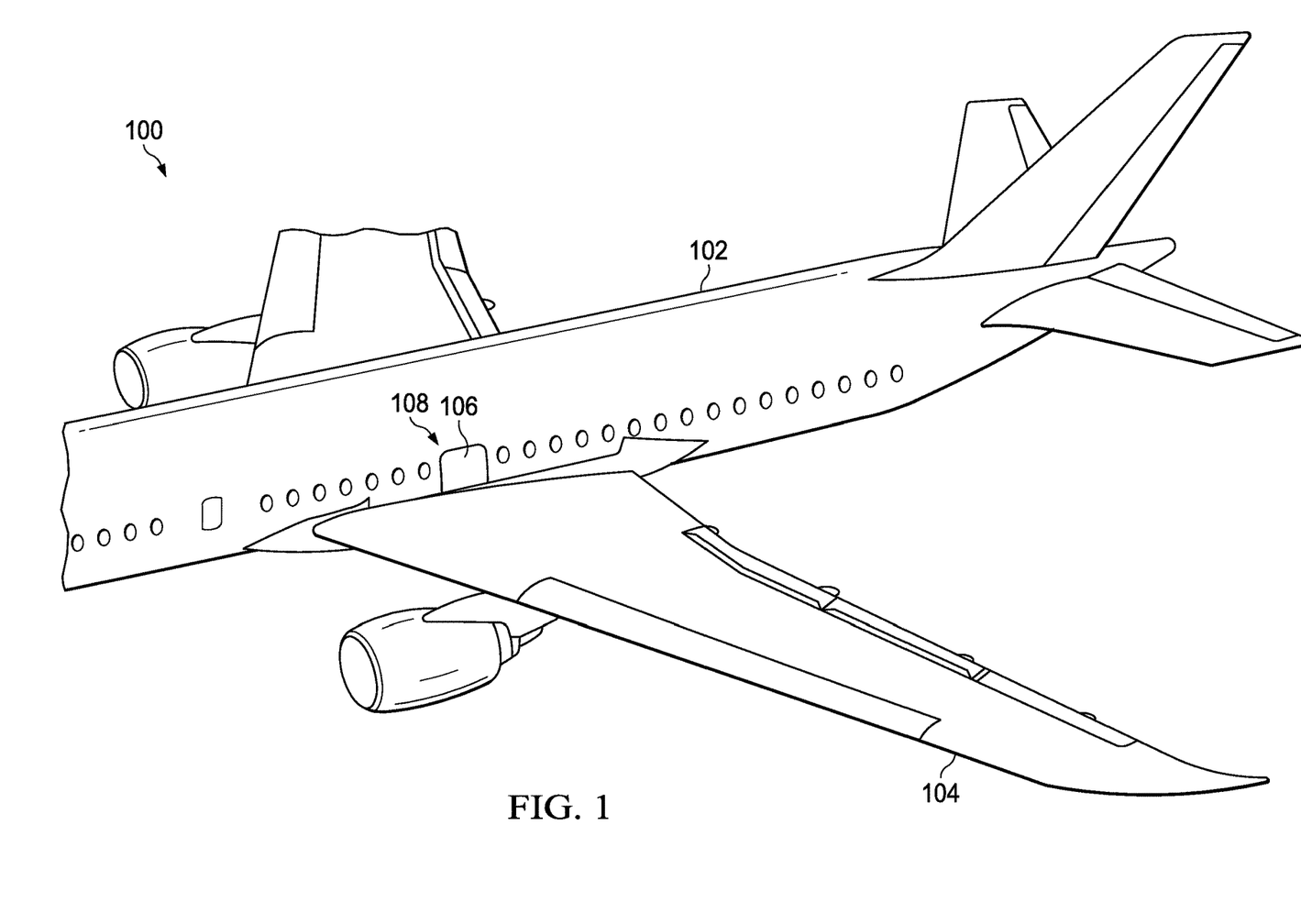
FIG. 1 is an illustration of a section of an aircraft in accordance with an illustrative embodiment.

With reference now to the figures and, in particular, with reference to FIG. 1, an illustration of a section of an aircraft is depicted in accordance with an illustrative embodiment. FIG. 1 depicts a section of aircraft 100 with body 102 and wing 104. Body 102 is a fuselage in this illustrative example. Above wing 104 is overwing exit door 106. Overwing exit door 106 is part of overwing exit door system 108. A similarly situated overwing exit door is present on the opposite side of body 102 (not shown in this view). Opening of overwing exit door 106 may be initiated automatically or by a human operator using various components in overwing exit door system 108.

Figure 2:
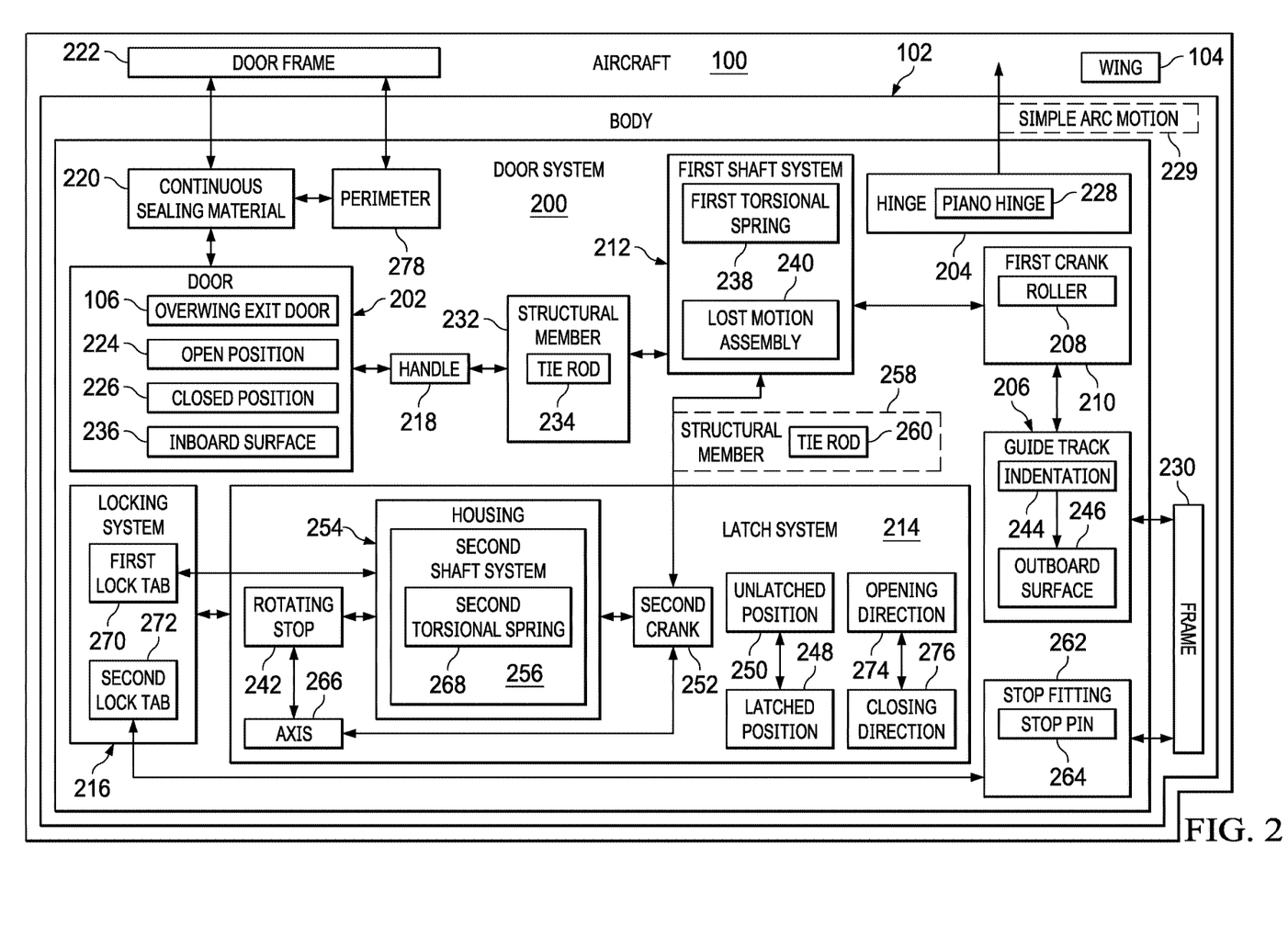
FIG. 2 is an illustration of a block diagram of an aircraft in accordance with an illustrative embodiment.

Turning now to FIG. 2, an illustration of a block diagram of an aircraft is depicted in accordance with an illustrative embodiment. Aircraft 100 is a platform where door system 200 may be implemented. Overwing exit door system 108 from FIG. 1 may be a physical implementation of door system 200 shown in block form in this figure.

In this illustrative example, door system 200 in body 102 of aircraft 100 comprises door 202, hinge 204, guide track 206, roller 208, first crank 210, first shaft system 212, latch system 214, locking system 216, handle 218, and continuous sealing material 220. Door 202 is received by door frame 222. Door 202 is the structural barrier between the interior of aircraft 100 and the environment surrounding aircraft 100 above wing 104, inclusive of any windows, hatches, access panels, covers, or structural components added to door 202 itself to counteract loads during the operation of aircraft 100.

Door 202 moves between open position 224 and closed position 226 using door system 200. Open position 224 is a position wherein door 202 is oriented outside aircraft 100 that allows egress of passengers. Closed position 226 is a position wherein door 202 is oriented within door frame 222.

Door 202 is connected to body 102 of aircraft 100 using hinge 204. Hinge 204 may take the form of any structural mechanism having components configured to join body 102 of aircraft 100 with door 202 such that door 202 swings between open position 224 and closed position 226.

In this illustrative example, hinge 204 takes the form of piano hinge 228. Piano hinge 228 connects door 202 to body 102 of aircraft 100. The use of piano hinge 228 allows door 202 to swing outboard/inboard in simple arc motion 229 between open position 224 and closed position 226. Additional rotation or translation of door 202 itself is unnecessary.

As depicted, guide track 206 is connected to body 102 of aircraft 100. Specifically, guide track 206 is fixed to frame 230 of body 102 of aircraft 100. Guide track 206 comprises a group of structural components configured to receive roller 208 and guide roller 208 during operation of door 202 in a desired manner.

Roller 208 is a component configured to roll along guide track 206. Roller 208 moves along guide track 206 in one direction when door 202 is opening. Roller 208 moves in the opposite direction along guide track 206 when door 202 is closing.

In this illustrative example, first crank 210 is a structural component attached to roller 208 and first shaft system 212. First crank 210 is configured to move roller 208 along guide track 206. First shaft system 212 comprises an elongate tube configured to rotate first crank 210 and roller 208.

First shaft system 212 is also connected to handle 218 in some fashion. For example, without limitation, first shaft system 212 may be connected to handle 218 by structural member 232. Structural member 232 moves as a passenger pulls handle 218. In this illustrative example, structural member 232 takes the form of tie rod 234. Tie rod 234 initiates the rotation of first shaft system 212 in this illustrative example.

As depicted, handle 218 is a lever operated device connected to inboard surface 236 of door 202. Handle 218 is configured in such a manner that a passenger can reach and pull handle 218 to initiate movement of first shaft system 212 and first crank 210. In other illustrative examples, handle 218 may include one or more buttons or other automated devices that trigger the opening of door 202. In other words, manual operation of handle 218 may not be necessary in some illustrative embodiments.

As illustrated, first shaft system 212 is associated with first torsional spring 238 and lost motion assembly 240. First torsional spring 238 is a mechanism surrounding the shaft that helps hold door system 200 in its closed state. First torsional spring 238 prevents undesired opening of door 202. For example, first torsional spring 238 may prevent first shaft system 212 from rotating backward in an undesired manner. First torsional spring 238 forces door 202 to remain in closed position 226, thus providing a level of redundancy.

In this illustrative example, lost motion assembly 240 is a group of structural components that serves as a timing system. Lost motion assembly 240 allows for movement of first shaft system 212 while latch system 214 remains stationary. Lost motion assembly 240 is configured to delay rotation of rotating stop 242 until roller 208 reaches indentation 244 in guide track 206.

Indentation 244 is located in outboard surface 246 of guide track 206. Indentation 244 may take various forms. For example, without limitation, indentation 244 may take the form of a groove, a channel, a depression, a section with a waved or sinusoidal shape, or some other type of indentation. The location of indentation 244 along guide track 206 is selected such that movement of door system 200 dwells to allow rotating stop 242 in latch system 214 to move from latched position 248 to unlatched position 250. Roller 208 moves out of indentation 244 when rotating stop 242 reaches unlatched position 250.

In this illustrative example, latch system 214 comprises rotating stop 242, second crank 252, housing 254, and second shaft system 256. Latch system 214 is connected to first shaft system 212 via structural member 258. Structural member 258 may take the form of tie rod 260 and connect first shaft system 212 to second crank 252 in latch system 214 in this illustrative example. The components within latch system 214 are moveable mechanical elements that, when engaged, prevent door 202 from opening.

Rotating stop 242 is a component that engages with stop fitting 262. Stop fitting 262 is fixed to frame 230 in body 102 of aircraft 100. Stop fitting 262 is configured to engage with rotating stop 242 when rotating stop 242 is in latched position 248. Stop fitting 262 may comprise stop pin 264. Stop pin 264 is normal or orthogonal to the pressure load. The engagement of stop pin 264 with rotating stop 242 provides a structural load path for the internal pressure between door 202 and body 102.

As illustrated, second crank 252 is associated with rotating stop 242. Second crank 252 is a structural component configured to rotate rotating stop 242 about axis 266 from latched position 248 to unlatched position 250 such that door 202 can open freely. Rotating stop 242 reaches unlatched position 250 when roller 208 clears guide track 206.

Second shaft system 256 is an elongate tube connected to second crank 252 and rotating stop 242. Second shaft system 256 and second crank 252 rotate simultaneously. Second shaft system 256 is located within housing 254 and may be associated with second torsional spring 268. Second torsional spring 268 is a mechanism surrounding the shaft that helps hold door system 200 in its closed state, preventing undesired opening of door 202.

In this illustrative example, locking system 216 comprises mechanical elements that prevent latch system 214 from becoming disengaged in an undesired manner. Locking system 216 is configured to secure rotating stop 242 in latched position 248 when door 202 is in closed position 226. Locking system 216 comprises first lock tab 270 and second lock tab 272.

As depicted, first lock tab 270 is associated with stop fitting 262. First lock tab 270 is configured to prevent rotating stop 242 from rotating in opening direction 274 when rotating stop 242 is engaged with stop fitting 262. Second lock tab 272 is associated with housing 254 of second shaft system 256. Second lock tab 272 is configured to prevent second crank 252 from rotating in closing direction 276 when rotating stop 242 is engaged with stop fitting 262. Rotating stop 242 moves in opening direction 274 from latched position 248 to unlatched position 250. First lock tab 270 and second lock tab 272 prevent over-stop travel.

In this illustrative example, door frame 222 receives door 202 when door 202 is in closed position 226. Continuous sealing material 220 surrounds perimeter 278 of door 202. Continuous sealing material 220 may comprises various types of materials. For example, without limitation, continuous sealing material 220 may comprise rubber, silicon, fiber glass reinforcement, and other suitable types of material. Continuous sealing material 220 is configured to seal door 202 when door 202 is received by door frame 222.

In some illustrative examples, a single piece of continuous sealing material 220 is used such that no gaps between segments of sealing material are present. The elimination of gaps between material segments allows for a more robust seal between door 202 and door frame 222 such that leaks are limited.

Although the illustrative embodiments are described with reference to aircraft 100, door system 200 may be applicable to other types of platforms as well. For example, without limitation, door system 200 may be implemented in a mobile platform, a stationary platform, a land-based structure, an aquatic-based structure, or a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, or some other suitable platforms.

Similarly, although door system 200 has been described with reference to door 202 that allows egress or ingress of passengers, in other illustrative examples, door 202 in door system 200 may take other forms. For example, without limitation, door 202 may be a hatch, an access panel, a compartment door, a cover, or other suitable types of access points on the exterior of aircraft 100 that needs similar mechanisms to effectively operate and/or comply with FAA certification requirements.

With an illustrative embodiment, door system 200 provides a locking and latching mechanism compliant with Section 25.783 and other applicable sections of Title 14, Code of Federal Regulations (CFR), part 25. The illustrative embodiments provide weight and complexity advantages over currently used systems. Further, the single-stop configuration of the illustrative embodiments allows more room for passenger egress during an emergency.

Sliding interfaces are eliminated in favor of rotating interfaces, making the system simpler and removing the necessity for a passenger to have to pull up or translate the door in any fashion to initiate movement. Door 202 stays in door frame 222 using door system 200 in a free-floating manner with continuous sealing material 220 acting as a cork. If body 102 of aircraft 100 deforms, door 202 with door system 200 does not substantially react to deformation loads. Moreover, the illustrative embodiments contemplate a door system that can be retrofitted on currently used aircraft while meeting the most recent FAA guidance on safety for fuselage doors and hatches.

The illustrative embodiments further contemplate a door system that provides a locking system that is connected directly to, and is part of, the door latch. Door 202 locks automatically while rotating stop 242 is resting on stop pin 264.

Figure 3:
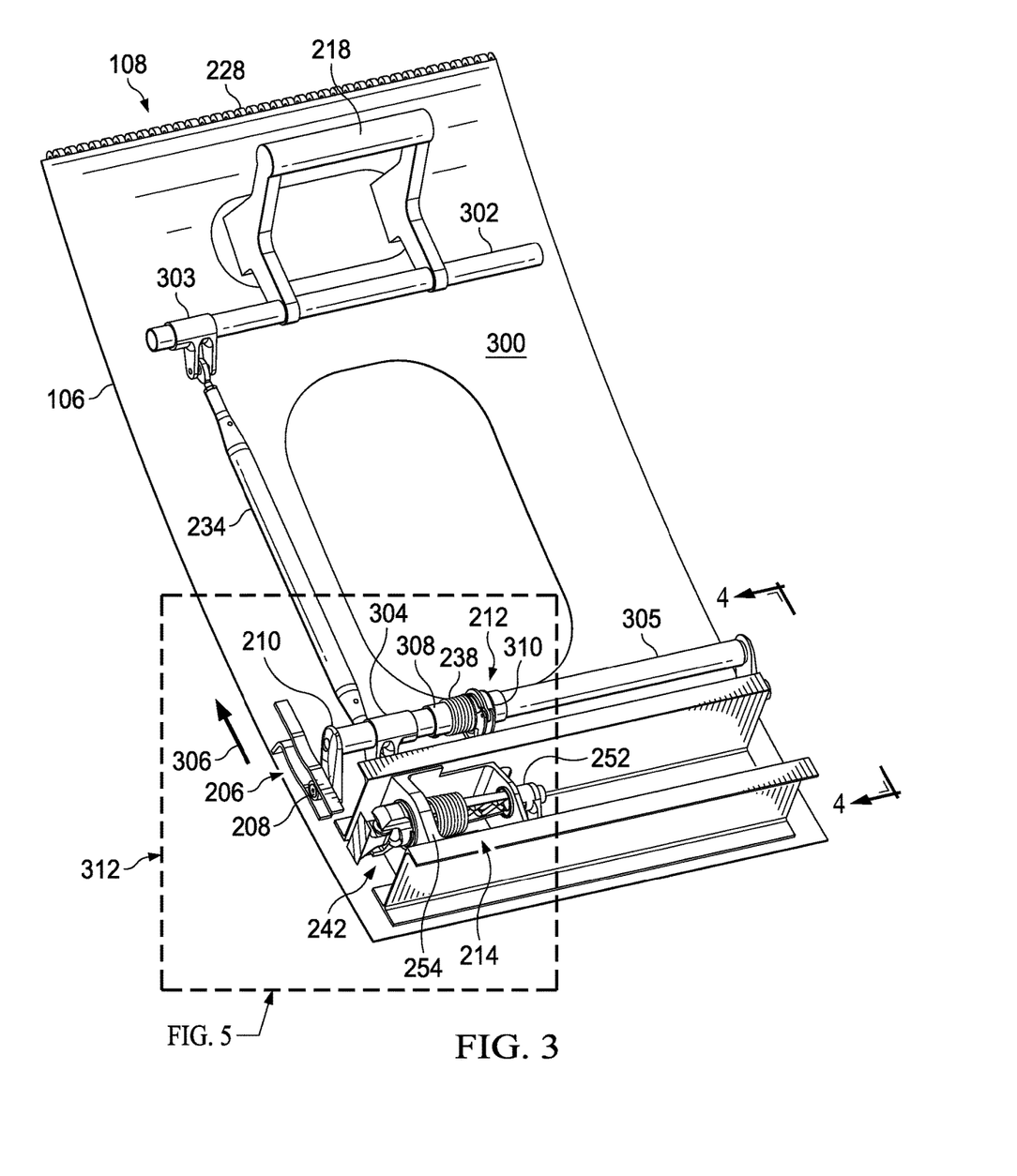
FIG. 3 is an illustration of a perspective view of an overwing exit door system in accordance with an illustrative embodiment.

With reference next to FIG. 3, an illustration of a perspective view of an overwing exit door system is depicted in accordance with an illustrative embodiment. The components described herein are examples of physical implementations of door system 200 shown in block form in FIG. 2.

In this view, inboard surface 300 of overwing exit door system 108 is shown without body 102 of aircraft 100. Handle 218 is connected to tie rod 234 via structural member 302 and connector 303. When a passenger pulls handle 218, structural member 302 rotates, thereby pulling tie rod 234 upward. Tie rod 234 is connected to torque tube 305 in first shaft system 212 by connector 304. Connector 303 and connector 304 may be called mating cranks in these illustrative examples.

As tie rod 234 moves in response to pulling handle 218, torque tube 305 rotates, thereby moving first crank 210 and roller 208. Roller 208 starts moving along guide track 206 in the direction of arrow 306. These components together may be known as the "position crank assembly" or similar terminology. Their collective operation pulls overwing exit door 106 slightly inboard.

As illustrated, lost motion assembly 240 delays movement of the system. Lost motion assembly 240 comprises lost motion slider 308 and lost motion crank 310. Lost motion crank 310 engages with torque tube 305 after overwing exit door 106 has been pulled inboard by roller 208. Engagement between lost motion crank 310 and torque tube 305 is realized by physical contact between the mating parts.

First torsional spring 238 can also be seen in this view. Section 312 of overwing exit door system 108 is shown in greater detail in FIG. 5.

Figure 4:
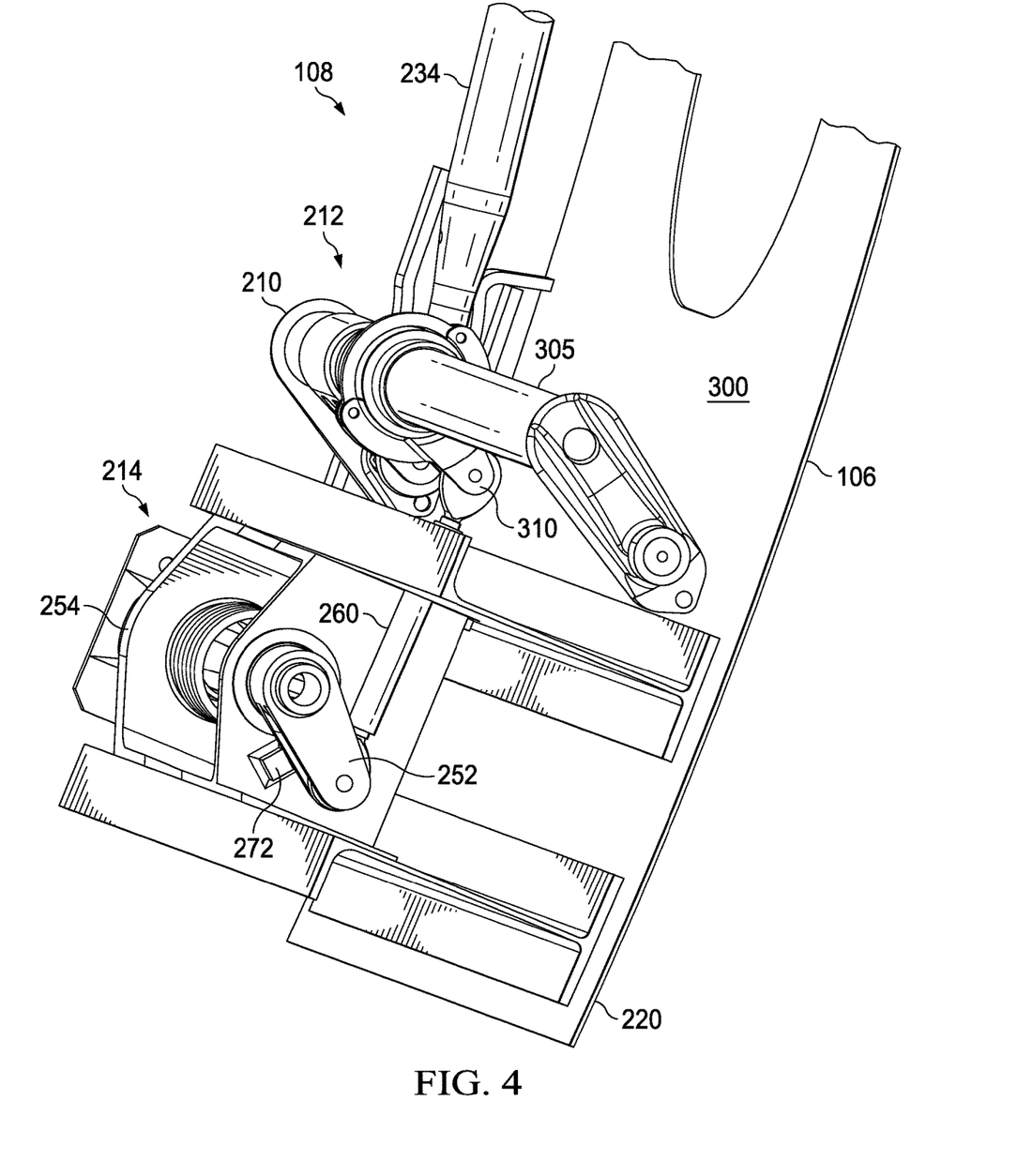
FIG. 4 is another illustration of a perspective view of an overwing exit door system in accordance with an illustrative embodiment.

Turning now to FIG. 4, an illustration of a perspective view of an overwing exit door system is depicted in accordance with an illustrative embodiment. This view of overwing exit door system 108 is shown in the direction of view lines 4-4 in FIG. 3.

In this depicted example, tie rod 260 connects lost motion crank 310 to second crank 252. The rotation of lost motion crank 310 triggers rotation of second crank 252.

Second crank 252 is connected to rotating stop 242. Second shaft system 256 is held by housing 254. Second lock tab 272 is associated with housing 254. Second lock tab 272 may be connected to housing 254 or manufactured as part of housing 254. Second lock tab 272 prevents second crank 252 from rotating past the position showed in this view.

Continuous sealing material 220 surrounds overwing exit door 106. Continuous sealing material 220 comprises one continuous piece of rubber in this illustrative example.

Figure 5:
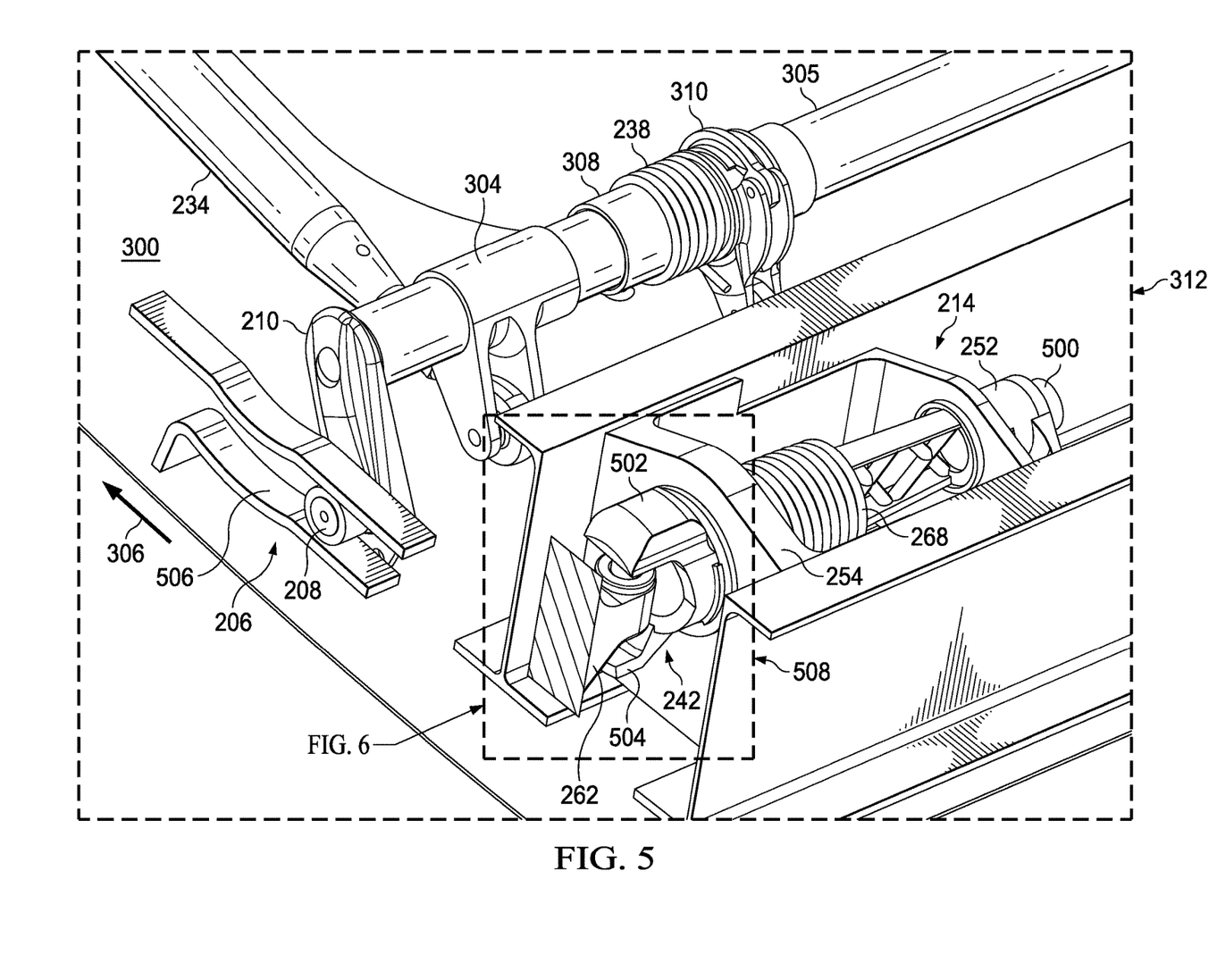
FIG. 5 is an illustration of a section of an overwing exit door system in accordance with an illustrative embodiment.

In FIG. 5, an illustration of a section of an overwing exit door system is depicted in accordance with an illustrative embodiment. Section 312 of overwing exit door system 108 from FIG. 3 is shown in greater detail in this view. The components are shown in a closed position.

Second torsional spring 268 surrounds torque tube 500 within housing 254. Rotating stop 242 comprises latch feature 502 and lock feature 504. Rotating stop 242 with latch feature 502 and lock feature 504 resembles a claw shape in this illustrative example. Other configurations of rotating stop 242 may be utilized and the illustration of rotating stop 242 in these figures is not meant to be limiting of the design or configuration of the rotating joints in overwing exit door system 108.

Latch feature 502 disengages when lost motion crank 310 on torque tube 305 couples the motion of torque tube 500 connected to rotating stop 242. By this time, overwing exit door 106 has been pulled inboard, disengaging locking system 216, allowing rotation of rotating stop 242.

As illustrated, stop fitting 262 is connected to a structural member of body 102 of aircraft 100 (not shown in this view). Stop fitting 262 is shown engaged with latch feature 502 while rotating stop 242 is in the closed position. Section 508 shows these components in greater detail.

In this illustrative example, roller 208 controls the inboard position of overwing exit door 106. In this view, overwing exit door 106 is in its fully closed, latched, and locked state.

Roller 208 rolls along outboard surface 246 of guide track 206. The initial motion of roller 208 along guide track 206 brings overwing exit door 106 inboard. After such time, lost motion crank 310 engages. Roller 208 reaches dwell 506. Dwell 506 is an example of indentation 244 shown in block form in FIG. 2.

Roller 208 rides within dwell 506 to allow rotating stop 242 to fully rotate to its unlatched (opened) position. This rotation is approximately 90 degrees. Of course, overwing exit door system 108 may be designed in various ways and rotating stop 242 may rotate fewer or more degrees to unlatch, unlock, or both.

Figure 6:
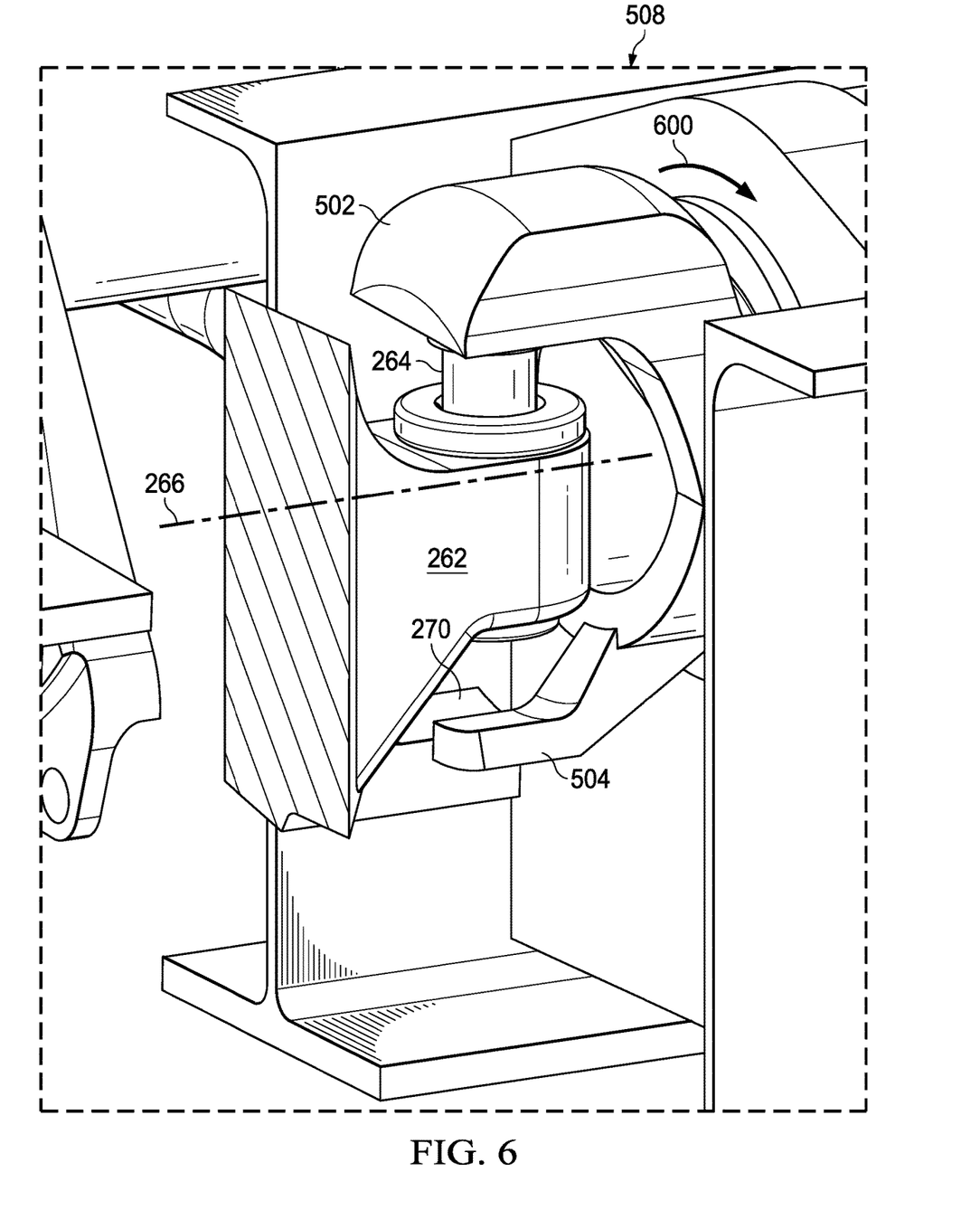
FIG. 6 is an illustration of a rotating stop and stop fitting in accordance with an illustrative embodiment.

FIG. 6 is an illustration of a rotating stop and stop fitting depicted in accordance with an illustrative embodiment. In this illustrative example, section 508 depicts latch feature 502 of rotating stop 242 engaged with stop pin 264 in stop fitting 262.

Overwing exit door 106 is locked when rotating stop 242 with latch feature 502 is unable to turn. Lock feature 504 is a built-in finger on rotating stop 242. Lock feature 504 engages with first lock tab 270 associated with stop fitting 262. This interaction between components prevents rotation of rotating stop 242 in the open direction, thus locking the system when the door is fully closed and latched. Lock feature 504 disengages when overwing exit door 106 is pulled inboard by the door position cranks (i.e., first crank 210, first shaft system 212, lost motion crank 310). When the system is in operation, rotating stop 242 will rotate about axis 266 in the direction of arrow 600 to unlatch and unlock (approximately 90 degrees).

Figure 7:
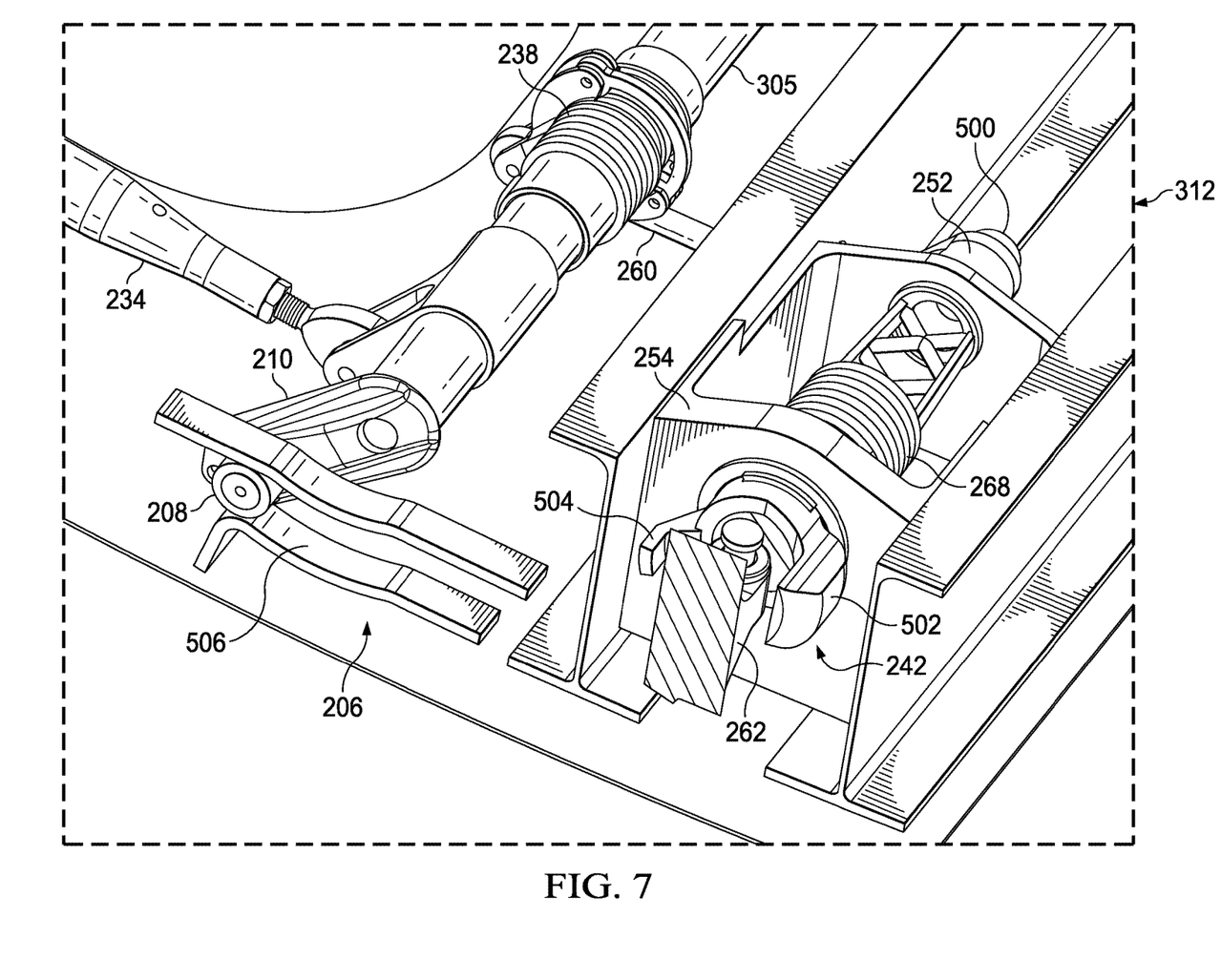
FIG. 7 is an illustration of an overwing exit door system in an open position in accordance with an illustrative embodiment.

In FIG. 7, an illustration of an overwing exit door system in an open position is depicted in accordance with an illustrative embodiment. In this illustrative example, rotating stop 242 has fully rotated about axis 266 in the direction of arrow 600. Lock feature 504 clears lock tab 270, allowing overwing exit door 106 to wing past first lock tab 270 and to its open state.

With rotating stop 242 rotated to its unlatched state, the shape of guide track 206 holds roller 208 in this state while overwing exit door 106 swings outboard. Once rotating stop 242 is clear of stop fitting 262, roller 208 clears guide track 206. First torsional spring 238 and second torsional spring 268 return the door to its closed position. In other words, overwing exit door 106 will remain outside aircraft 100 but rotating stop 242 will return to the closed position.

To close overwing exit door 106, handle 218 will need to be held in a fully open state, while overwing exit door 106 is operated manually in the reverse direction. Once roller 208 has contacted the inboard surface of guide track 206, handle 218 can be released. Thereafter, overwing exit door 106 must be held in closed position 226 until handle 218 has reset. After overwing exit door 106 has been secured in closed position 226 and handle 218 has reset (i.e., returned to a closed position as well), the operator may release overwing exit door 106. The same process would occur if overwing exit door 106 were to be operated by an automated system or computer program.

The different components shown in FIG. 1 and FIGS. 3-7 may be combined with components in FIG. 2, used with components in FIG. 2, or a combination of the two. Additionally, some of the components in FIG. 1 and FIGS. 3-7 may be illustrative examples of how components shown in block form in FIG. 2 may be implemented as physical structures.

Other configurations of door system 200 may be implemented other than those shown in FIG. 1 and FIGS. 3-7. The configurations described herein are not meant to be limiting as to the placement, orientation, type, or configuration of any component in door system 200.

Figure 8:
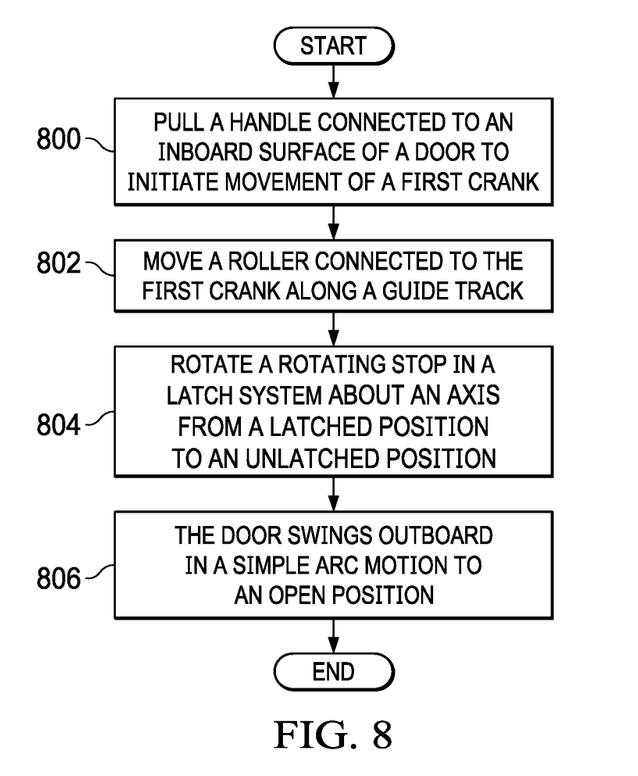
FIG. 8 is an illustration of a flowchart of a process for operating an overwing exit door in accordance with an illustrative embodiment.

With reference next to FIG. 8, an illustration of a flowchart of a process for operating an overwing exit door is depicted in accordance with an illustrative embodiment. The method depicted in FIG. 8 may be used to open and close door 202 using door system 200 in FIG. 2.

The process begins by pulling a handle connected to an inboard surface of a door to initiate movement of a first crank (operation 800). Next, a roller connected to the first crank moves along a guide track (operation 802). As the roller moves along the guide track, a rotating stop in a latch system rotates about an axis from a latched position to an unlatched position (operation 804). Once the rotating stop is in the unlatched position, the door swings outboard in a simple arc motion to an open position (operation 806), with the process terminating thereafter. A piano hinge connecting the door to the body of the aircraft facilitates this movement.

Except for operation 800, the process reverses itself to close door 202. Door system 200 is designed such that the components described with reference to FIG. 2 mechanically rotate, dwell, or otherwise move at a desired interval to provide optimal timing for the opening/closing of door 202.

Figure 9:
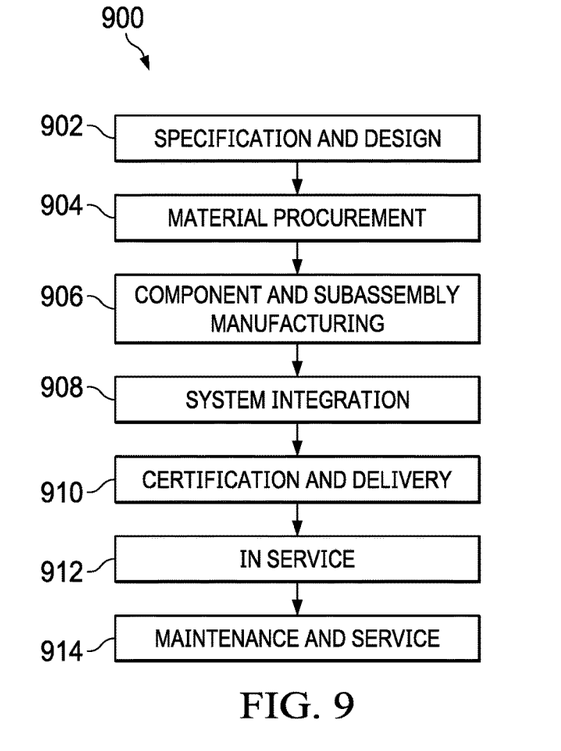
FIG. 9 is an illustration of a block diagram of an aircraft manufacturing and service method in accordance with an illustrative embodiment.
Figure 10:
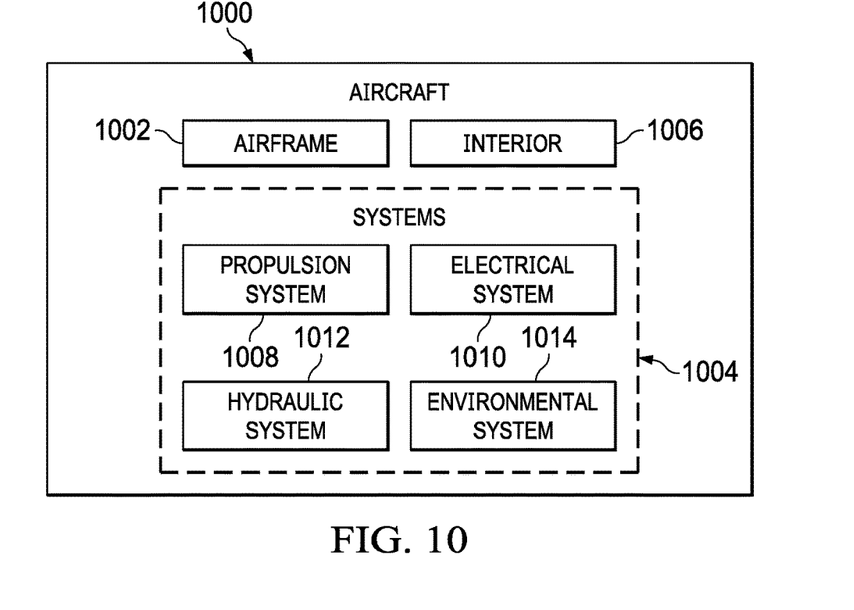
FIG. 10 is an illustration of a block diagram of an aircraft in which an illustrative embodiment may be implemented.

The illustrative embodiments of the disclosure may be further described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance, service, or inspection.

Overwing exit door system 108 may be installed on an aircraft during component and subassembly manufacturing 906. In addition, an overwing exit door system may be removed and overwing exit door system 108 may be retrofitted onto aircraft 1000 during routine maintenance and service 914 as part of a modification, reconfiguration, or refurbishment of aircraft 1000 in FIG. 10.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 10, an illustration of a block diagram of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914, inclusive of inspection, in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A door system of an aircraft comprising:
   a door;
   a piano hinge configured to connect the door to a body of the aircraft;
   a guide track configured to connect to the body of the aircraft;
   a roller;
   a first crank connected to the roller and configured to move the roller along the guide track;
   a first shaft system attached to the first crank and configured to rotate the first crank and the roller;
   a latch system connected to the first shaft system, the latch system comprising:
   a rotating stop;
   a second crank associated with the rotating stop and configured to rotate the rotating stop from a latched position to an unlatched position; and a second shaft system connected to the second crank and the rotating stop; a locking system configured to secure the rotating stop in the latched position; and a stop fitting configured to connect to the body of the aircraft and configured to engage with the rotating stop when the rotating stop is in the latched position.

2. The door system of claim 1, wherein the locking system comprises:

a first lock tab associated with the stop fitting and configured to prevent the rotating stop from rotating in an opening direction when the rotating stop is engaged with the stop fitting; and a second lock tab associated with a housing of the second shaft system and configured to prevent the second crank from rotating in a closing direction when the rotating stop is engaged with the stop fitting.

3. The door system of claim 2 further comprising:

a handle connected to an inboard surface of the door, wherein pulling of the handle initiates movement of the first crank.

4. The door system of claim 3 further comprising:

a tie rod connecting the first shaft system to the second crank.

5. The door system of claim 1 further comprising:

a continuous sealing material surrounding a perimeter of the door and configured to seal the door when the door is received by a door frame.

6. The door system of claim 1, wherein the rotating stop reaches the unlatched position when the roller clears the guide track.

7. The door system of claim 1 further comprising:

an indentation in an outboard surface of the guide track, wherein the indentation is configured to dwell movement of the door system to allow the rotating stop to move to the unlatched position.

8. The door system of claim 7, wherein the first shaft system comprises:

a lost motion assembly configured to delay rotation of the rotating stop until the roller reaches the indentation.

9. The door system of claim 1 further comprising:

a first torsional spring associated with the first shaft system; and a second torsional spring associated with the second shaft system.

10. A method for overwing exit door operation, the method comprising:

moving a roller along a guide track using a first crank while the door is in a closed position;

rotating a rotating stop in a latch system about an axis from a latched position to an unlatched position using a second crank, wherein the second crank is associated with the first crank; and swinging the door outboard from the closed position in a simple arc motion to an open position using a piano hinge connecting the door to a body of an aircraft.

11. The method of claim 10 further comprising:

reversing movement of the roller in the guide track using the first crank;

rotating the rotating stop about the axis from the latched position to the unlatched position using the second crank; and engaging the rotating stop with a stop fitting connected to the body of the aircraft.

12. The method of claim 10 further comprising:

pulling a handle connected to an inboard surface of the door to initiate movement of the first crank.

13. The method of claim 12 further comprising:

engaging a locking system with a first lock tab associated with the stop fitting when the door is in a closed position.

14. The method of claim 12 further comprising:

delaying rotation of the rotating stop using a lost motion assembly until the roller reaches an indentation in an outboard surface of the guide track.

15. An aircraft comprising:

an overwing exit door system comprising;

a door;

a piano hinge connecting the door to a body of the aircraft;

a guide track connected to the body of the aircraft;

a roller;

a first crank connected to the roller and configured to move the roller along the guide track;

a first shaft system attached to the first crank and configured to rotate the first crank and the roller;

a latch system connected to the first shaft system, the latch system comprising:

a rotating stop;

a second crank associated with the rotating stop and configured to rotate the rotating stop from a latched position to an unlatched position; and a second shaft system connected to the second crank and the rotating stop;

a stop fitting connected to the body of the aircraft, wherein the rotating stop is configured to engage with the stop fitting when the rotating stop is in the latched position; and a locking system configured to secure the rotating stop in the latched position.

16. The aircraft of claim 15, wherein the overwing exit door system further comprises:

a continuous sealing material surrounding a perimeter of the door.

17. The aircraft of claim 15, wherein the locking system comprises:

a first lock tab associated with the stop fitting; and a second lock tab associated with a housing of the second shaft system.

18. The aircraft of claim 15, wherein the overwing exit door system further comprises:

an indentation in an outboard surface of the guide track, wherein the indentation is configured to dwell movement of the overwing exit door system to allow the rotating stop to move to an unlatched position.

19. The aircraft of claim 18, wherein the overwing exit door system further comprises:

a lost motion assembly configured to delay rotation of the rotating stop until the roller reaches the indentation.

20. The aircraft of claim 15, wherein the overwing exit door system further comprises:

a handle connected to the first shaft system.

* * * * *